Patented May 24, 1949

2,470,894

UNITED STATES PATENT OFFICE 2,470,894

PRODUCTION OF POLYOLEFINIC HYDROCARBONS

Warren W. Johnstone, Riverside, Ill., assignor to Universal Oil Products Company, Chicago, Ill., a corporation of Delaware No Drawing. Application September 21, 1945, Serial No. 617,927

3 Claims. (Cl. 260—666)

This application is a continuation-in-part of my copending application Serial No. 515,298, filed December 22, 1943, now abandoned.

This invention relates to the production of polyolefinic and cyclo-olefinic hydrocarbons containing a large number of conjugated double bonds. More particularly the present invention concerns the production of conjugated polyolefinic hydrocarbons useful as drying oils by contacting saturated hydrocarbons of the alkane type, including cyclo-alkanes, with substantially anhydrous hydrogen fluoride and separating said drying oil hydrocarbons from the resultant mixture of "sludge" hydrocarbons and hydrogen fluoride.

In the art related to the alkylation of hydrocarbons employing substantially anhydrous hydrogen fluoride, it has been observed that under certain reaction conditions the mixture of hydrocarbons and hydrogen fluoride charged to the alkylation reactor separates into a hydrocarbon layer and an acid layer, the latter containing a complex mixture of hydrocarbons and hydrofluoric acid known in the art as a "sludge." However, the methods employed in these processes for recovering the hydrocarbons from the acid layer or from the sludge generally result in the polymerization of the hydrocarbons into tar-like resinous products of high molecular weight containing few, if any, of the more desirable unsaturated hydrocarbons. These methods in general rely upon separating the hydrocarbons from the sludge product by fractional distillation, which process enhances the polymerization of the unsaturated hydrocarbons contained in the sludge by prolonged contact with the hydrogen fluoride at high pressures and high temperatures. On the other hand, I have discovered that the unsaturated hydrocarbons may be recovered from the hydrogen fluoride complexes by rapid distillation at low temperatures and at low pressures and that the hydrocarbons thus recovered retain their valuable unsaturated characteristics making them especially desirable as drying oil products and as intermediates in the synthesis of various chemical compounds and products useful to the arts such as plastics and resins. I have further discovered that the yield of desirable unsaturated sludge hydrocarbons may be increased by employing certain optimum ratios of hydrocarbon reactants and hydrogen fluoride as hereinafter more fully described.

It is an object of my invention to provide a process for the production of hydrocarbons useful in compounding paints and varnishes, in preparing resins and plastics, in the manufacture of siccatives, in the production of drying oils, and for the manufacture of other useful materials as hereinafter disclosed.

It is another object of my invention to provide a process for the manufacture of polyolefinic and cyclo-olefinic hydrocarbons containing conjugated as well as non-conjugated unsaturation by contacting a saturated hydrocarbon selected from the group of hydrocarbon compounds referred to as paraffins and naphthenes with substantially anhydrous hydrogen fluoride and removing from the resultant mixture said polyolefinic hydrocarbons.

In one embodiment my invention comprises a process for manufacturing a drying oil by contacting substantially anhydrous hydrogen fluoride with a saturated highly branched chain paraffin, removing a hydrocarbon-containing layer, and subjecting said layer to flash distillation at low temperatures and low pressures thereby removing hydrogen fluoride from the desired drying oil.

Another embodiment of the present invention comprises reacting a straight-run paraffinic or naphthenic base petroleum fraction boiling generally below about 350° C. with substantially anhydrous hydrogen fluoride at conversion temperatures and pressures and recovering from the hydrogen fluoride sludge produced thereby a polyolefinic hydrocarbon containing conjugated unsaturation.

In a specific embodiment of the present invention a hydrocarbon charge containing normally gaseous or normally liquid paraffins is intimately contacted with hydrogen fluoride under sufficient pressure to maintain a substantial proportion of the mixture in liquid phase and at a temperature within the range of from about —20° to about 150° C. and separating from the resultant hydrogen fluoride layer an unsaturated hydrocarbon containing conjugated double bonds by distilling said acid layer at a subatmospheric pressure.

The hydrocarbon starting materials which may be treated according to the present process with substantially anhydrous hydrogen fluoride may comprise individual hydrocarbons in pure form and of non-aromatic structure, of either normally gaseous or normally liquid character, or mixtures of the above hydrocarbons such as certain fractions derived from petroleum stocks. The preferred class of saturated hydrocarbons which are susceptible to treatment as hereinafter described comprise the paraffins of cyclic structure (the naphthenes such as cyclohexane, cycloheptane and others, or their alkyl derivatives) or the highly branched chain paraffins such as are represented by many paraffinic hydrocarbons containing quaternary or tertiary carbon atoms. Typical examples of said latter hydrocarbons are: 2,2,4-trimethylpentane, 2,2,4,4,6-pentamethylheptane, and homologs or alkyl derivatives thereof. Usually, the long chain paraffins containing more than 5 carbon atoms per molecule yield drying oils of more desirable properties than paraffinic hydrocarbons of shorter chain length or of less highly branched structure. Suitable hydrocarbon mixtures utilizable in the preparation of the present drying oils comprise certain boiling range fractions of petroleum (such as a straight-run gasoline fraction boiling up to about 200° to about 250° C.). In some instances it may be preferable to employ straight-run petroleum distillates boiling over a wider range than that indicated above, such as gas oil and distillates boiling as high as 450° to 500° C., the latter starting materials are especially desirable when higher molecular weight unsaturated hydrocarbons are required for any specific use, or when such fractions are more readily available or at a lower cost.

The hydrogen fluoride reagent used in the preparation of the product of the present invention is preferably substantially anhydrous hydrogen fluoride; however, hydrofluoric acid containing not more than 15% and preferably not more than 10% of water may be employed when suitable reaction conditions are maintained such as high contact temperatures. If, after repeated recycling of the reagent to the contacting reactor as hereinafter described, the hydrogen fluoride is reduced in concentration below the above preferred levels, the reagent may be reconcentrated to the anhydrous condition by fractional distillation. An alternative procedure for maintaining the hydrogen fluoride reagent as its optimum concentration comprises drying the hydrocarbon charging stock prior to the reaction stage of the process, although this procedure is not generally preferred, since it is relatively more convenient to continuously reconcentrate the acid rather than to employ elaborate means for drying the hydrocarbon charging stock.

To prepare polyolefinic hydrocarbons having a high degree of conjugated unsaturation which comprises the product of the present process, a hydrocarbon charge containing normally gaseous and/or normally liquid saturated hydrocarbons, such as the aforementioned paraffins or naphthenes, is treated in the presence of hydrogen fluoride under sufficient pressure to maintain at least a portion of the mixture in liquid phase, said pressure usually being below about 200 atmospheres and preferably from about 5 to about 20 atmospheres. The weight ratio of hydrogen fluoride to hydrocarbons charged into the reactor is usually maintained at a 1:1 ratio; this, however, may be increased to as high as 10:1 or higher if the nature of the hydrocarbons or concentration of the hydrogen fluoride required. Intimate contact between hydrocarbon and hydrogen fluoride may be maintained by some form of agitation such as mixing, stirring, etc., so as to form a mixture or emulsion of hydrocarbons and hydrogen fluoride. The reaction temperature may vary from as low as about −20° to as high as 150° C., but preferably a temperature within the range of from about 10° to about 100° C. is preferred to effect the most desirable production of the present product. Upon completion of the reaction, usually within a period of from about ½ to 1 hour but which may extend to 4 or 5 hours in some instances, the reaction mixture is allowed to settle and an upper hydrocarbon layer is separated from a lower layer containing a major proportion of the hydrogen fluoride charged into the reaction simply by decanting one layer from the other. The acid phase contains substantially all of the hydrogen fluoride introduced into the contacting vessel and also contains the desired polyolefinic hydrocarbons which are believed to be entrained and/or dissolved in the acid, or chemically combined with the hydrogen fluoride in the form of loosely-held complexes. The latter complexes, in most instances, are not of the alkyl fluoride type of reaction product but are better exemplified by the hydrated forms of certain metallic salts, such as $CuSO_4.5H_2O$, which may be decomposed into water and a lower hydrate of the metallic salt by application of heat. The hydrogen fluoride layer of the reaction product is then directed to an acid recovery zone wherein hydrogen fluoride reagent is removed from the hydrocarbons contained in the layer, preferably by vacuum distillation, although the layer may also be treated with water, aqueous caustics or other suitable reagents to liberate the hydrocarbons from the hydrogen fluoride. Vacuum distillation techniques are preferred in this treatment not only because of simplicity and reduced cost of operation, but also because of the fact that the polyolefinic hydrocarbons, ultimately recovered in purified form retain their highly desired conjugated unsaturation, high molecular weight, and cyclic structure. In effecting the recovery of hydrocarbons from the hydrogen fluoride layer of the reaction products by distilling off the hydrogen fluoride at reduced pressure it is generally preferred to maintain the pressure during the distillation as low as possible and to conduct the separation as rapidly as conditions will permit. The effect of temperature, pressure, and the period of contact between the hydrocarbons and hydrogen fluoride during the course of distilling the hydrogen fluoride from the hydrocarbon complex on the properties of the polyolefinic product recovered after removal of the hydrogen fluoride is indicated in the following table:

*Recovery of polyolefinic hydrocarbons from hydrogen fluoride-hydrocarbon complexes by distillation of the hydrogen fluoride from the complex at various pressures*

| Conditions | Slow Distillation | Rapid Distillation | Vacuum Distillation |
|---|---|---|---|
| Maximum Flask Temperature, °C | 350 | 175 | 138 |
| Pressure, mm | 760 | 760 | 90-102 |
| Time, hours (total) | 25.8 | 3.6 | 11.75 |
| Properties of Polyolefinic Hydrocarbons recovered: | | | |
| Molecular Weight | 369 | 336 | 308 |
| Bromine Number | 91 | 147 | 158 |
| No. of Double Bonds Per Molecule | 2.1 | 3.1 | 3.0 |
| Diene Number | 5 | 50.7 | 53.5 |
| $d_4^{20}$ | 0.896 | 0.885 | 0.890 |
| $n_D^{20}$ | 1.5023 | 1.5050 | 1.5037 |

The data of the above table indicate that as the distillation temperature and the period of contact between the hydrocarbons and hydrogen fluoride charged to the distillation flask are increased, the polyolefinic hydrocarbons subsequently recovered after removal of the hydrogen fluoride are more highly polymerized and contain fewer unsaturated bonds in the hydrocarbon molecules, especially of the conjugated type of double bonds. The data thus indicate that the product derived from the acid layer which has been subjected to long contact periods and at high temperatures possesses little conjugated unsaturation (as determined by the diene number), and consequently has little or no value as a drying oil. It is known that hydrogen fluoride catalyzes polymerization reactions of olefinic and polyolefinic hydrocarbons, especially at high temperatures, and it is believed that this property of hydrogen fluoride is responsible for the increase of molecular weight, and the decrease in the conjugated and non-conjugated unsaturation of the product recovered from hydrogen fluoride-hydrocarbon complexes subjected to high temperatures at prolonged periods of contact time. The results of a large number of such experiments indicate that perhaps polymerization of the polyolefinic hydrocarbons contained in the acid layer charged to the distillation flask occurs substantially simultaneously with the release of the polyolefinic hydrocarbon from the complex as distillation proceeds. Since the quality of the hydrocarbons recovered from hydrogen fluoride complexes varies in direct proportion to the above named factors, it is desirable to maintain distillation temperatures as low as is compatible with a reasonable and desirable rate of recovery.

The recovered hydrogen fluoride released from combination with the polyolefinic hydrocarbon complexes may, of course, be recycled to the original reaction stage of the process and repeatedly utilized for converting additional hydrocarbon charge stock. The hydrocarbon layer separated in the initial conversion stage, wherein the hydrocarbons are originally contacted with the hydrogen fluoride, contains a large percentage of unconverted hydrocarbons and, therefore, may also be recycled in the process. On a continuous basis of operation, a portion of the hydrocarbon recycle stream may be removed from the process and supplanted by fresh hydrocarbon charge stock. The removed portion of unconverted hydrocarbons may then be fractionated to separate the specific cuts containing more desirable hydrocarbon components, the latter being charged to the initial hydrogen fluoride contacting stage of the process.

In general, the polyolefinic hydrocarbon product of the process of this invention comprises a series of high molecular weight cyclic compounds of wide boiling range, but generally of homologous structure which contain a relatively large number of conjugated olefinic double bonds, although the exact composition of the product will vary somewhat depending upon the particular charging stock, the concentration of the hydrogen fluoride utilized, and the conditions of operation employed. Infra-red and ultra-violet adsorption studies of the polyolefinic hydrocarbon product as well as other pertinent analytical data determined on the hydrocarbons have shown that the cyclic dienes contained therein have isolated unsaturation in addition to conjugated unsaturation, and that the 4 carbon atoms which constitute the conjugated system are highly substituted with hydrocarbon radicals, possessing, on the average, fewer than 2 hydrogen atoms per mol as substituents; that is, some of the cyclic polyolefinic hydrocarbons contain conjugated di-olefinic units of 4 carbon atoms joined by alternate double and single bonds and each of said units has 4 substituents, not more than 2 of which are hydrogen. Di-olefinic units of this nature may thus be represented by the general formula

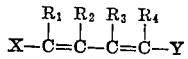

in which X and Y represent other parts of the cyclic polyolefinic molecule and $R_1$, $R_2$, $R_3$, and $R_4$ represent substituents such as hydrogen, alkyl groups, alkenyl groups, cyclo-olefin groups etc.

The polyolefinic product which may be prepared as hereinbefore described has a wide boiling range of from about 150° to over 450° C., density of about 0.83 to about 0.93, index of refraction of about 1.47 to about 1.53 (but usually 1.48 to 1.50), specific dispersion of about 125 to about 175 (but usually between 135 and 145), bromine numbers above about 140 (although they vary considerably with the average molecular weight), maleic anhydride values of about 30 to about 90 (usually in the range of about 45 to 75), acid number below 3, average number of olefinic double bonds per molecule varying between about 2.5 and about 4, of which from about 40 to about 70 per cent are conjugated, and average molecular weights from about 200 to about 400, although the usual average is in the neighborhood of 300. Polyolefinic hydrocarbon fractions containing hydrocarbons having molecular weights as low as about 150 to as high as about 1000 have also been prepared, although under the conditions at which high molecular weight hydrocarbons are produced a considerable proportion of these hydrocarbons contain fewer conjugated double bonds. If high molecular weight polyolefinic hydrocarbons are desired it is usually necessary to charge long chain, highly branched hydrocarbons in the initial stages of preparation. Although hydrogen/carbon atomic ratios of the polyolefinic hydrocarbons vary somewhat depending upon the particular source of the material, they usually range from about 1.67 to about 1.72, with the actual weight percentages of hydrogen varying from about 12.35 to about 12.6.

The properties of the polyolefinic hydrocarbons will, of course, vary somewhat depending upon whether the entire boiling range of material or a specific fraction of the product is separated. In general, the lower boiling fractions have similar properties regardless of the conditions employed in their preparation and are water-white to straw-yellow in color. The higher boiling fractions are in general somewhat darker, contain some dicyclic hydrocarbons, and differ in other respects from the lower boiling fractions, while those derived from hydrocarbon charge stocks containing even small amounts of aromatic hydrocarbons are more highly colored and usually do not possess as desirable drying properties. In some cases it may be preferable to fractionate the total polyolefinic hydrocarbon product to separate more desirable fractions thereof suitable for specific uses. The distillation may be conducted under vacuum, with steam, or at atmospheric pressure, since polyolefinic hydrocarbons not in contact with hydrogen fluoride are not as readily polymerized and may generally be distilled under normal temperature and pressure without substantial loss of their desirable properties.

The polyolefinic hydrocarbons remaining in the fractionating apparatus after removal of hydrogen fluoride may be treated to remove any traces of free acid remaining in the hydrocarbon layer to obtain a purified hydrocarbon product. Said treatment may comprise either steam or vacuum distillation or washing the hydrocarbon layer with water or aqueous alkali solutions. If desired, the fluidity of the polyolefinic hydrocarbon may be increased by commingling the same with a non-reactive hydrocarbon solvent, such as pentane, followed by thorough mixing of the solutions and treatment with an alkaline reagent to neutralize any free acid present in the hydrocarbon. The treated mixture is then directed to a separation zone in which the hydrocarbon solvent is removed by any suitable means, such as distillation, and the desired product recovered. The hydrocarbons may be used in this form or they may be further treated to improve their color by contact with selected solid adsorbents (activated charcoal, fuller's earth, etc.) by distillation as described above (preferably with steam or vacuo), or by mild acid and clay treatments.

The present polyolefinic hydrocarbons may be utilized for any purpose in which relatively high molecular weight hydrocarbons containing conjugated and non-conjugated unsaturation are desired. For example, these compounds are useful in the preparation of drying oils which may be incorporated in the manufacture of paints and varnishes in which unsaturated glyceride oils are now employed. The polyolefinic hydrocarbons comprising this invention act as drying oils for the same reasons that hold true for said glyceride oils; that is, the unsaturated bonds, and especially the conjugated unsaturated bonds, are capable of adding oxygen and polymerizing to high molecular weight ketonic and/or acidic derivatives when exposed in thin films to air. Polyolefinic hydrocarbons of the present type containing conjugated double bonds are also useful in the preparation of various organic derivatives by virtue of the capacity of such hydrocarbons to react with dienophiles such as maleic, fumaric, crotonic, mesaconic, citraconic and other acid anhydrides as well as their amides, esters, nitriles, etc. These compounds may also be employed as intermediates in the preparation of resinous and plastic compositions, or when converted to the acids may be employed in the manufacture of siccatives, etc.

The following examples are illustrative of the methods which may be employed in the preparation of the present polyolefinic hydrocarbons, but the examples should in no manner be interpreted as limiting the scope of the invention in accordance with the conditions cited in said examples:

Example I

A saturated hydrocarbon fraction comprising chiefly paraffinic and naphthenic components (839 g.) obtained as an alkylation product having an initial boiling point of about 170° C. and an end boiling point of 320° C. was charged continuously over 3.5 hours into a reactor containing 824 g. of anhydrous hydrogen fluoride and supplied with a stirring mechanism for obtaining intimate contact between the hydrocarbon and the hydrogen fluoride charge. The reaction mixture was stirred constantly during the conversion at a temperature of 36.8° C. and a pressure of 150 pounds per square inch. After completion of the reaction, the mixture was directed to a settling zone in which an upper layer comprising essentially unreacted hydrocarbons and a lower layer containing hydrogen fluoride were separated. The hydrogen fluoride layer was withdrawn to a distillation zone operated at a temperature of about 127° C. and at a pressure of about 85 to 101 mm. from which the hydrogen fluoride was removed and recycled to the reaction zone. Substantially all of the hydrogen fluoride was removed after a period of 1.5 hours leaving a hydrocarbon residue in the distillation flask amounting to 108 g.

The hydrocarbon residue remaining in the distillation flask was found to have a molecular weight of 313, density of 0.896, and an average number of double bonds per molecule of 3.6.

Example II 812 g. of iso-octane (2,2,4-trimethylpentane) is charged into a mechanically agitated reactor with 689 g. of 95% hydrogen fluoride over a period of 4.0 hours, while the reaction mixture is maintained at a temperature within the range of about 30° to about 35° C. and at a pressure of 165 pounds per square inch. The mixture is allowed to settle into 2 layers; an upper layer containing 133 g. of isobutane, a trace of n-butane, 102 g. of paraffins containing from 5 to 8 carbon atoms per molecule, 144 g. of iso-octane and n-octane, and 385 g. of paraffins containing 9 or more carbon atoms per molecule. The lower hydrogen fluoride layer is separated by vacuum distillation operated at an absolute pressure of 70 to 93 mm. into purified hydrogen fluoride and a residue containing 46.5 g. of polyolefinic hydrocarbons which have the following properties; molecular weight 423, density 0.854, bromine number 162, diene number 57.3 and refractive index of 1.5042.

I claim as my invention:

1. A process for the production of a polyolefinic material containing hydrocarbons possessing both conjugated and non-conjugated unsaturation which comprises contacting a hydrocarbon charge consisting essentially of saturated hydrocarbons with hydrogen fluoride at a temperature of from about −20° C. to about 150° C. and a pressure sufficient to maintain at least a portion of the reaction mixture in the liquid phase, separating the reaction mixture into a hydrocarbon phase and a hydrogen fluoride phase containing said polyolefinic material, distilling said hydrogen fluoride phase at a subatmospheric pressure not greater than about 100 millimeters absolute to separate hydrogen fluoride therefrom, and recovering the residual polyolefinic material.

2. The process of claim 1 further characterized in that said charge consists essentially of a mixture of paraffins and naphthenes.

3. The process of claim 1 further characterized in that said charge consists essentially of iso-octane.

WARREN W. JOHNSTONE.

REFERENCES CITED

The following references are of record in the file of this patent:

UNITED STATES PATENTS

| Number | Name | Date |
|---|---|---|
| 2,301,335 | Showalter | Nov. 10, 1942 |
| 2,343,744 | Burk | Mar. 7, 1944 |
| 2,360,629 | Matuszak | June 1, 1943 |
| 2,371,341 | Matuszak | Mar. 13, 1945 |
| 2,378,636 | Iverson | June 19, 1945 |
| 2,388,156 | Kelley | Oct. 30, 1945 |
| 2,392,962 | Abrams et al. | Jan. 15, 1946 |
| 2,408,933 | Iverson | Oct. 8, 1946 |
| 2,413,310 | Bloch | Dec. 31, 1946 |